United States Patent
Jones et al.

(10) Patent No.: US 7,782,830 B2
(45) Date of Patent: *Aug. 24, 2010

(54) EXTENDED RANGE WIRELESS PACKETIZED DATA COMMUNICATION SYSTEM

(75) Inventors: David Victor Jones, Palm Bay, FL (US); Warren Todd Wilson, Malabar, FL (US); Raymond J. Kolar, Grant, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/431,464

(22) Filed: Apr. 28, 2009

(65) Prior Publication Data

US 2009/0232123 A1 Sep. 17, 2009

Related U.S. Application Data

(63) Continuation of application No. 10/391,467, filed on Mar. 18, 2003, now Pat. No. 7,545,793.

(51) Int. Cl.
H04J 3/16 (2006.01)
H04L 12/50 (2006.01)

(52) U.S. Cl. .................... 370/346; 370/373

(58) Field of Classification Search .......... 370/351, 370/346, 468, 342, 343, 345, 373, 374; 340/3.1, 340/5.65, 10.2

See application file for complete search history.

(56) References Cited

U.S. PATENT DOCUMENTS

| | | | | |
|---|---|---|---|---|
| 4,251,865 A | * | 2/1981 | Moore et al. | 710/109 |
| 4,774,707 A | | 9/1988 | Raychaudhuri | 370/95 |
| 5,012,469 A | | 4/1991 | Sardana | 370/95.3 |
| 5,231,634 A | | 7/1993 | Giles et al. | 370/95.1 |
| 5,436,905 A | | 7/1995 | Li et al. | 370/95.2 |
| 5,881,064 A | * | 3/1999 | Lin et al. | 370/389 |
| 6,040,786 A | | 3/2000 | Fujioka | 340/928 |
| 6,349,210 B1 | | 2/2002 | Li | 455/450 |
| 6,959,406 B2 | | 10/2005 | Goldsack et al. | 714/704 |
| 7,124,343 B2 | | 10/2006 | Moulsley et al. | 714/748 |
| 2002/0172218 A1 | * | 11/2002 | Harrison | 370/449 |

* cited by examiner

*Primary Examiner*—George Eng
*Assistant Examiner*—Michael Faragalla
(74) *Attorney, Agent, or Firm*—Allen, Dyer, Doppelt, Milbrath & Gilchrist, P.A.

(57) ABSTRACT

A limited acknowledgement-based communication methodology increases the throughput efficiency of extended range, wireless packetized data transmissions to a 'master' data-reception site from a 'slave' data-sourcing site, geographically remote with respect to the data-reception site. Rather than return an acknowledgement for each received packet, the master returns an acknowledgement only after receipt of a group of packets. When returning an acknowledgement, the master identifies which packets of the group were not successfully received. Missing packets may be retransmitted by the slave transmitter either immediately, or in response to a subsequent poll by the master.

20 Claims, 5 Drawing Sheets

US 7,782,830 B2

EXTENDED RANGE WIRELESS PACKETIZED DATA COMMUNICATION SYSTEM

RELATED APPLICATION

This application is a continuation of Ser. No. 10/391,467 filed on Mar. 18, 2003, now U.S. Pat. No. 7,545,793 the disclosure of which is hereby incorporated by reference in its entirety.

FIELD OF THE INVENTION

The present invention relates in general to communication systems, and is particularly directed to a wireless packetized communication methodology and system therefor, that provides for enhanced transport efficiency, wireless packetized data transmission to a data-reception site from a data-sourcing wireless transceiver site that is geographically remote relative to the data-reception site.

BACKGROUND OF THE INVENTION

The communications industry has developed a number of efficient throughput, wireless packet-based communication methodologies or protocols (such as IEEE standard 802.11a internet protocol) that are intended for use within an office or intra-building environment, where transmission distances are relatively close (e.g., on the order of one to several hundred feet). While these protocols work reasonably well for such 'nested' or 'quasi-nested' local area networks (LANs), they are not readily suited for use with extended range applications (e.g., on the order of several tens of miles or more).

This latter type of environment suffers from the problem diagrammatically illustrated in FIG. 1, specifically the substantial transport delay that results from having to return an acknowledgement (ACK or NACK) transmission for each successively transmitted packet. (For example, the MAC acknowledgement layer of the above-referenced 802.11a protocol returns an ACK for each packet.) This problem is particularly noticeable in networks containing a large number of transmitters that must communicate over large distances with a reception/processing or relay site.

SUMMARY OF THE INVENTION

In accordance with the present invention, this problem is effectively obviated by a limited acknowledgement-based wireless communication methodology that is designed to substantially increase the transport efficiency of packetized data transmissions to a 'master' data-reception site from a 'slave' data-sourcing or transmission site, which is geographically remote relative to the data-reception site. Rather than requiring the master receiver to return an acknowledgement message in reply to each packet received by an interrogated transmitter, the present invention returns an acknowledgement only upon receipt of a plurality or group of packets, the number of which is known by the master and the slave. Moreover, when returning an acknowledgement message, the master identifies which, if any, packets of the group were not successfully received. These missing packets are then retransmitted by the slave transmitter in a manner dictated by the master, either immediately, or in response to a subsequent poll of that site by the data recipient. When retransmitted, the missing packets of the previous transmission are prepended to any new packets awaiting transmission.

DETAILED DESCRIPTION

Figure 1:
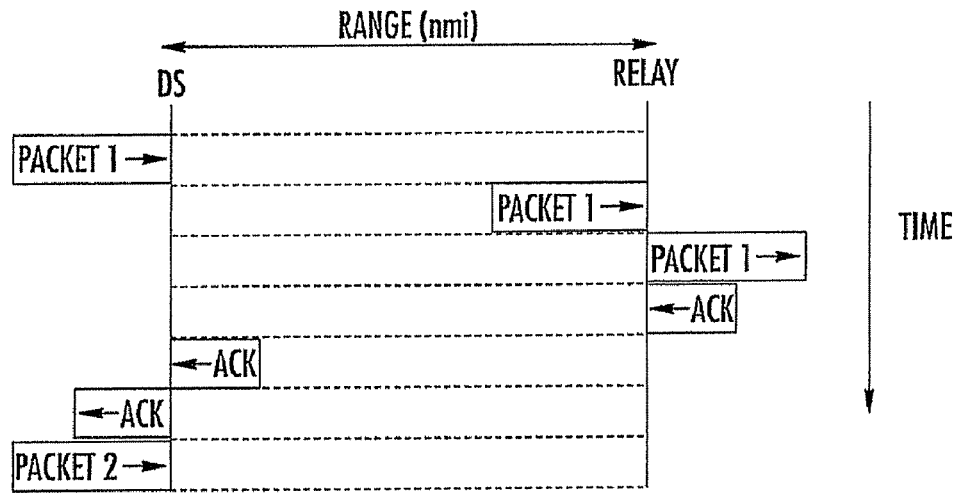
FIG. 1 diagrammatically illustrates the problem of transport delay associated with having to return an acknowledgement (ACK or NACK) transmission each of successively transmitted packets.

Before describing the extended range, wireless packetized data communication mechanism in accordance with the present invention, it should be observed that the invention resides primarily in what is effectively a prescribed communication protocol and augmentation of the control software employed by the micro-controllers of digital signaling and data-interface units of respective wireless transceivers located at geographically spaced apart data-sourcing and data-reception sites, to facilitate exchange of interrogation and response messages therebetween.

The digital signaling and data interface units may typically comprise modular arrangements of conventional digital communication circuits and associated digital signal processing components and attendant supervisory control circuitry therefor, that controls the operations of such circuits and components. In a practical implementation that facilitates their incorporation into wireless communication equipment, these modular arrangements may be readily implemented as field programmable gate array (FPGA)-implemented, or application specific integrated circuit (ASIC) chip sets.

Consequently, the configuration of these units and the manner in which they are interfaced with other communication and transducer components have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood.

Figure 2:
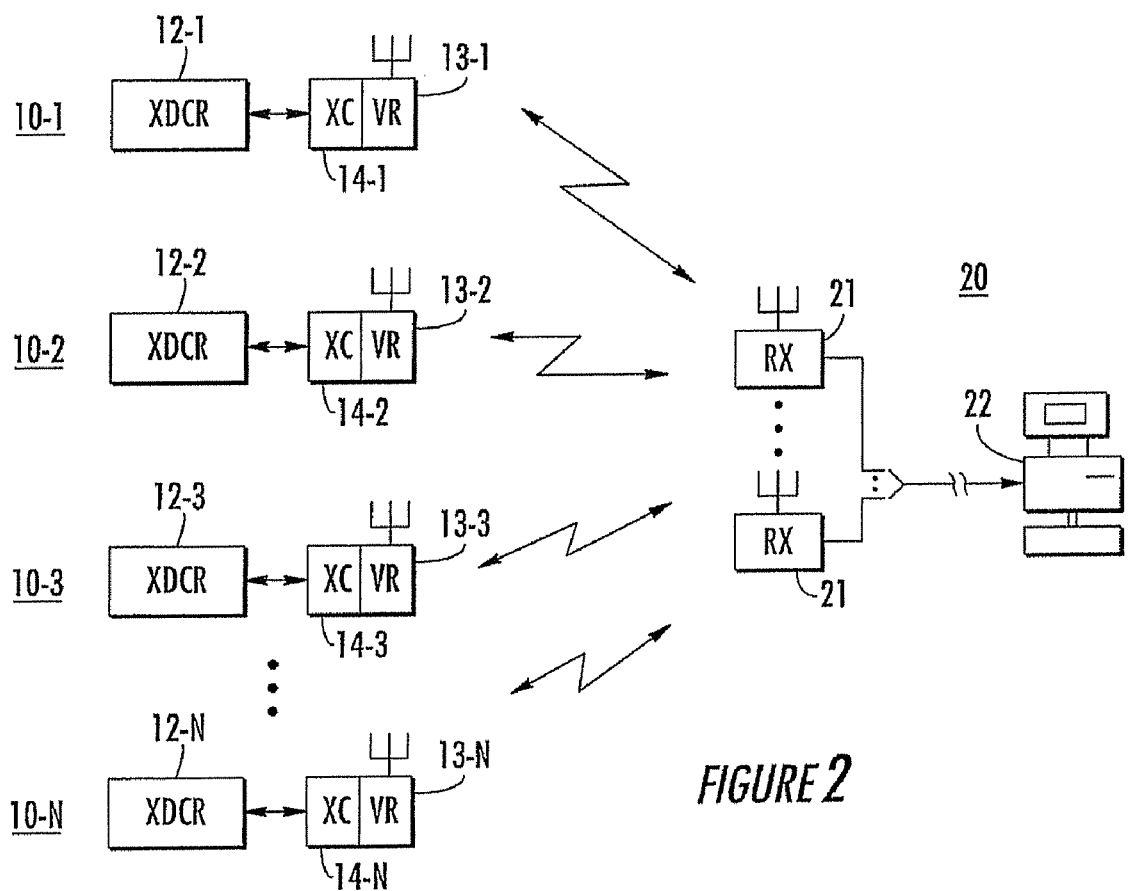
FIG. 2 diagrammatically illustrates a simplified example of a geographically dispersed wireless communication system in which the present invention may be employed.

FIG. 2 diagrammatically illustrates a simplified, non-limiting example of a geographically dispersed wireless communication system for which the present invention has particular utility. As shown, therein a plurality of transmitter sites 10-1, 10-2, 10-3, . . . , 10-N are dispersed over a prescribed data-gathering region, which may be considered to be geographically remote with respect to a data-recipient and processing site 20. By geographically remote is meant a considerable wireless transmission distance (e.g., on the order of several to multiple tens of miles) relative to separations between the transmitter sites (which may be, but are not limited to, on the order of several to more than tens of feet apart).

Disposed at each transmitter site is an information source, shown as transducers 12-1, 12-2, 12-3, . . . , 12-N, which are respectively coupled to associated wireless transceiver units 13-1, 13-2, 13-3, . . . , 13-N. For purposes of providing a non-limiting example, the transducers may correspond to motion sensors, such as but not limited to acoustic transducers (e.g., geophones), optical sensors (e.g., infrared detectors), and the like, which are interfaced with supervisory and monitoring controllers 14-1, 14-2, 14-3, . . . , 14-N of their associated wireless transceiver units. The transceivers employed at the remote sites 10 and associated transceivers at the data-recipient site 20 may comprise conventional wireless transceiver units, such as those which are capable of operating at a data transport rate of 500 kbps or greater.

As described briefly above, the remote site transceivers 13 serve as slave transmitter units, that are selectively polled by their associated master transceivers 21, which are interfaced with an associated data processing station 22, that may be co-located with the master transceivers or located at a separate facility. Alternatively, data-recipient site 20 may employ a single master transceiver that is operative to poll and collect information from the various slave transceivers at the remote sites. As will be described below, communications between a slave transceiver and a master transceiver are performed as poll-acknowledgement communications, and may comprise system-associated communications, status-associated communications and data communications.

Figure 3:
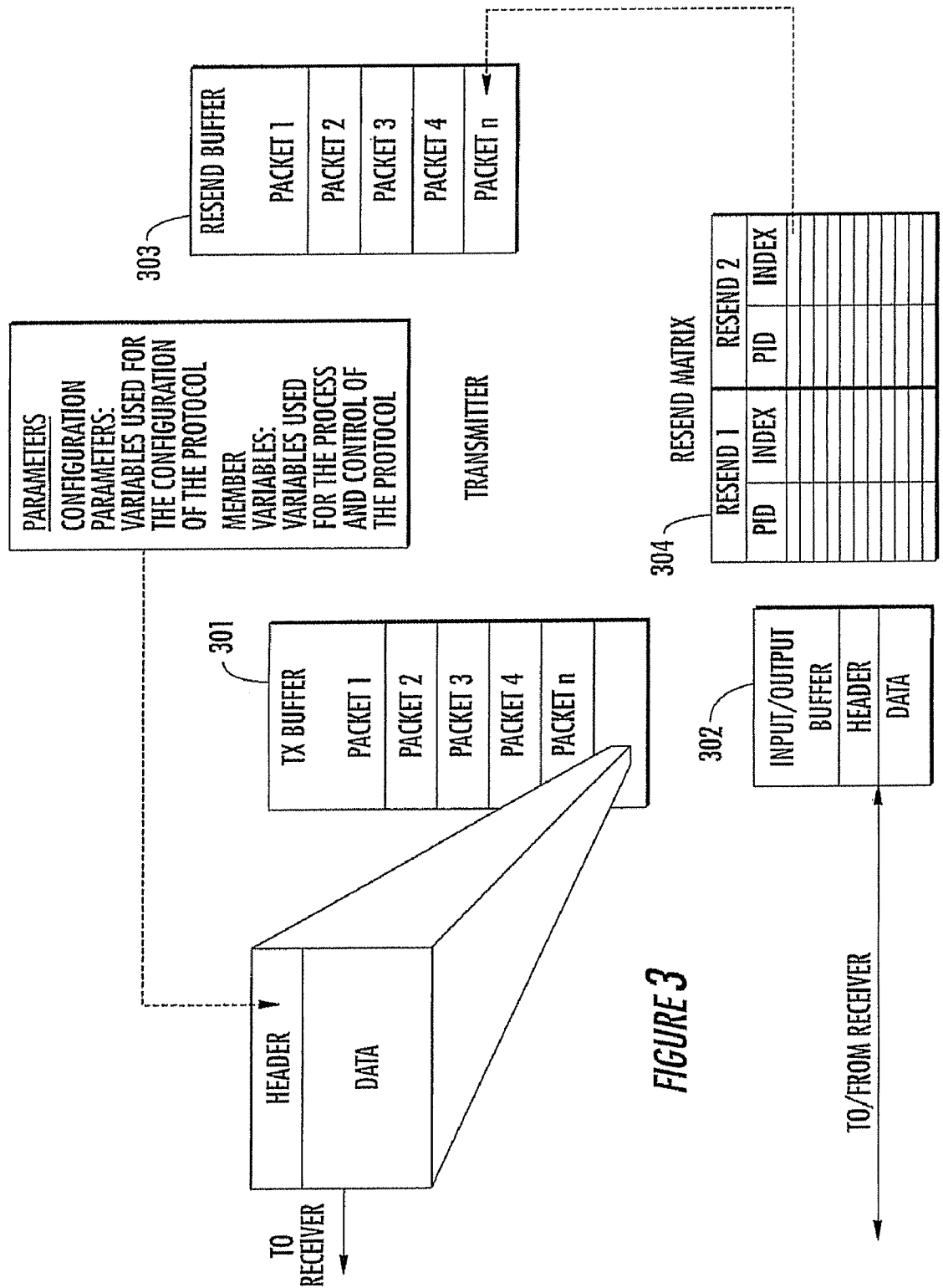
FIG. 3 diagrammatically illustrates a transmitter packet-handling architecture which implements the data-sourcing portion of the wireless packetized communication mechanism of the invention.

Attention is now directed to FIG. 3, which diagrammatically illustrates the packet-handling architecture of a respective one of the remote site located, slave transceiver units 13, that implements the interrogated or polled transmitter portion of the wireless packetized communication mechanism of the present invention. As shown therein, a slave transceiver includes an output buffer 301, which stores a group or plurality of packets intended for transmission to the data-recipient site. As a non-limiting example, a packet may be one kilobyte in length, and a packet group may comprise 150 packets, to realize a group size of 150 kbytes. Each packet contains a header field and a data field. The header field contains configuration parameters as well as variables used to process and control handling of the packet. The data field includes data to be transmitted, as may be derived from the transceiver's associated transducer. A receive buffer 302 receives an interrogation packet (or Poll) from the data-recipient site.

As pointed out above, when an acknowledgement message is returned to a transmitter by the data-recipient transceiver, it identifies which packets of the group that were previously transmitted, if any, had not been successfully received. Rather than transmit the entire group of packets, the interrogated transmitter transmits only the missing packets. For this purpose, the transmitter comprises a resend buffer 303 and an associated resend matrix 304. The resend buffer 303 has a storage capacity of one group. (It should be noted that the loss of all packets results in a retransmission of all the packets (Resend All). In such an instance, nothing is loaded in the resent buffer.) The transmission of data is limited to one group of data, so that the largest number of Resends will be a group size of data. Since only a group amount of data packets can be sent in a single transmission sequence, then the largest amount of possible Resends is a group sized amount of packets.

The resend matrix 304 is shown as comprising a dual or ping-pong buffer that stores the identification of packets that were not received by the data-recipient transceiver during a previous transmission, as identified in the acknowledge message. Each packet identification (PID) is associated with an index to a packet in the resend buffer. Being configured as a ping-pong buffer enables the resend matrix to accommodate the identification of both missing packets of a previously transmitted group, as well as the identification of any packets missing from the new group.

Figure 4:
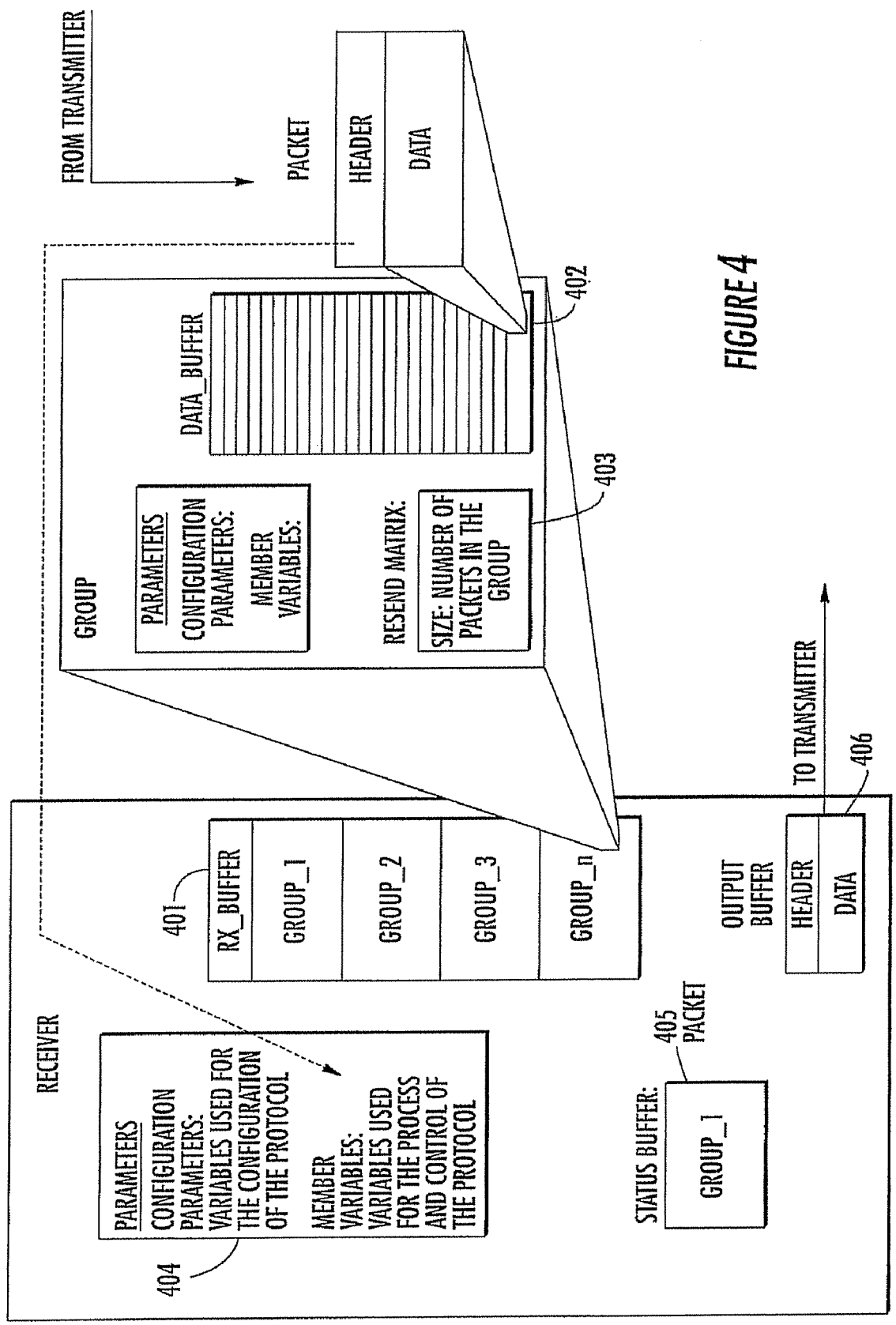
FIG. 4 diagrammatically illustrates a receiver packet-handling architecture which implements the data-recipient portion of the wireless packetized communication mechanism of the invention.

FIG. 4 diagrammatically illustrates the packet-handling architecture of the data-recipient transceiver 21 to implement the receiver portion of the wireless packetized communication mechanism of the invention. As shown therein, the receiver includes an input or receive buffer 401, which stores all incoming data, and is sized to accommodate multiple groups of data being received from a transmitter site as it is selectively polled by a data-recipient transceiver. A respective one of the group sections of the receive buffer 401 includes a data buffer 402 and an associated resend matrix 403. Data buffer 402 has a storage capacity sufficient to accommodate the currently configured number of packets that make up a single group.

The header portion of each packet (which may contain configuration parameters and member variables as shown at 404) is not stored in the data buffer, but is processed at the reception of the packets. The resend matrix 403 stores the identification of any missing packets of a received group. In addition to handling incoming packet group transmissions, the receiver further includes a status buffer 405, which is a single packet in length and is used to store either status or System (dependent upon the requested type) information separate from received data. An output packet buffer 406 stores the contents of outgoing packets intended for the transmitter site.

Figure 5:
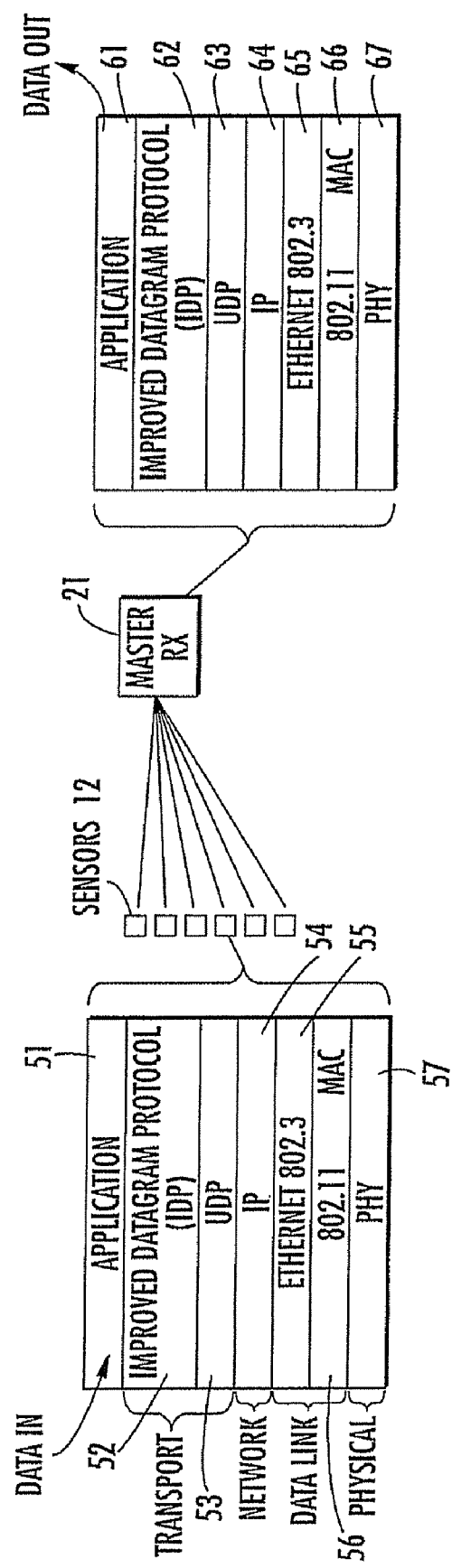
FIG. 5 shows the manner in which the wireless packetized data transport mechanism of the invention may be interfaced with a standard, layered-protocol wireless communication scheme.

FIG. 5 shows the manner in which the Improved Datagram Protocol or IDP packetized data transport mechanism of the invention may be interfaced with a standard, layered-protocol communication scheme. In particular, FIG. 5 shows the placement of an Improved Datagram Protocol or IDP layer 52 intermediate the application layer 51, which interfaces data, such as that from the transducers 12, and a user datagram protocol (UDP) transport layer 53. The UDP layer 52 is encapsulated on an internet protocol (IP) network layer 54, which is encapsulated on a data link layer comprised of an Ethernet 802.3 layer 55 or an 802.11 MAC layer 56. The physical layer corresponds to PHY layer 57.

Similarly, at the receiver (data-recipient site 20), an IDP layer 62 is interfaced with the application layer 61, which interfaces received sensor data to a downstream processing operator, and a UDP transport layer 63. The UDP layer 63 is encapsulated on an internet protocol (IP) network layer 64 which, in turn, is encapsulated on a data link layer comprised of an Ethernet 802.3 layer 65 or an 802.11 MAC layer 66. Again, the physical layer 67 corresponds to a PHY layer.

As pointed out briefly above, communications between a slave transceiver and a master transceiver may comprise system-associated communications, status-associated communications and data communications. The manner in which extended range, data communications are be carried out in accordance with the bulk data transport aspect of the present operates may be understood by referenced to FIG. 6, which shows a data communication sequence that is conducted between a remote transmitter at a data sourcing site and a receiver at the data-recipient site.

Figure 6:
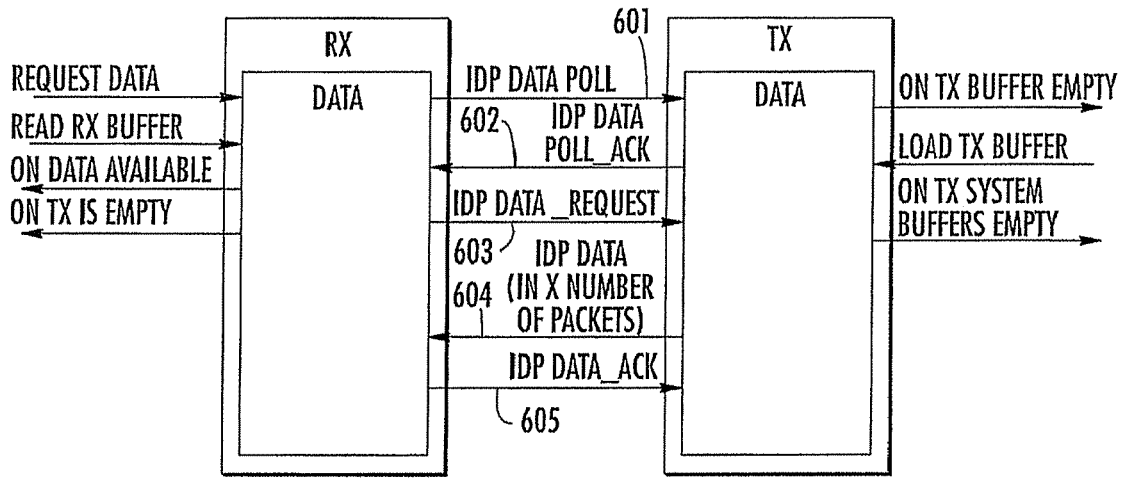
FIG. 6 shows a data communication sequence (wherein the data pipe is used for bulk data transmission) between a remote transmitter and a receiver at the data-recipient site using the improved datagram protocol employed by the wireless packetized data transport mechanism.

As described briefly above, and as shown in the bulk data pipe flow of FIG. 6, a data communication sequence between a data transmitter and the data-recipient is initiated by an interrogation or polling message in the form of a Data-Poll packet 601 that is transmitted from the data recipient to the remote transmitter. As described above, the Data-Poll packet 601 is forwarded to a specifically polled transmitter.

At the polled transmitter the contents of the Data-Poll packet are captured in the transmitter's input/output buffer 302 for processing by the transceiver's communications controller. In response to the Data-Poll, the transmitter returns a poll acknowledgement message in the form of a Data Poll-Ack packet 602, which indicates the total number of packets currently awaiting transmission in transmit buffer 301. The receiver already has knowledge of any additional (missed or Resend) packets that are awaiting transmission in the transmitter's resend buffer 303 for a previous poll, since it will have identified those packets in a previous data transmission sequence associated with that poll. In the present example, it will be assumed that there are no missing packets currently awaiting transmission. If Resend data did exist, it would be transmitted from the Resend buffer 303.

In response to the Data Poll-Ack packet 602, the receiver forwards a Data-Request packet 603 to the transmitter, the Data-Request packet indicating to the transmitter to send a group size of data. Namely, The Data-Request packet 603 only requests data, it does not indicate how many bytes are to be sent. As described previously, the largest amount of data during a data transport message is the maximum capacity of a group of packets which, in the present example, is 150 packets (one kbyte each) corresponding to 150 kbytes. In response to the Data-Request packet 603, the transmitter transmits a group of data packets as a Data message 604 to the receiver.

At the receiver, the data fields of the received group of packets are captured in the group's data buffer 302, while their header fields are processed. If any packets were not successfully received, they are tagged as such in the receiver's group specific resend matrix 303. The receiver then returns a data acknowledgement (Data-Ack) packet 605 to the transmitter. The header portion of the Data-Ack packet is used to indicate whether all of the data packets were received without error, or if one or more packets need to be retransmitted. If any packets need to be retransmitted, they are identified by encapsulating the PIDs of the Resend packets (as identified in the current unfilled groups resend matrix) in the data field of the Data-Ack packet 605.

A request to resend data may either identify which packets are to be resent or indicate that all packets with the exception of specifically enumerated packets are to be resent. The latter mechanism employs an error percentage configurable parameter (field) which identifies the percentage of packets that must be lost or failed to have been received in order to declare a catastrophic failure. The (Resend-All exception for any found Resend packets) capability is a configurable ON/OFF state parameter. If ON, then the Resends found are identified and are not to be resent. If OFF, then all the data is resent.

The header field of the Data-Ack packet 605 contains a Retransmit bit. The logical state of the Retransmit bit indicates whether the identified missing packets are to be immediately retransmitted, so as to effectively maintain an ongoing or 'continuing' transmission from the transmitter to the receiver, based upon a configurable percentage of valid data received in the last data communication sequence, or whether the transmitter is to wait for a further Data Poll packet from the receiver before retransmitting the missing packets). If the Retransmit bit is set (e.g., to a logical '1'), the transmitter immediately proceeds to transmit the next group of data packets to the receiver as it did in response to Send-Data packet 603, described above. In addition, this next group of packets is prepended with the requested missing packets. If the Retransmit bit is not asserted (e.g., a logical '0'), the transmitter must wait until the next Data Poll before transmitting.

The continuing data is a configurable parameter. It may be turned ON or OFF. When turned ON, the receiver knows how many packets are available at the transmitter from the previous Data Poll_ACK 602, so that the receiver can determine the maximum number of possible groups that can be obtained. (This is readily accomplished by dividing the packets with the group size to determine the maximum number of groups available.) The receiver therefore knows how many times to request data. The number of attempts may also be configurable, so that the receiver will selected the lesser of the two. The data must also be received within a certain percentage of error. The Continuing Data Percentage parameter is a configurable parameter and corresponds to the percentage of packets that must be received in order to allow continuing transmission.

In response to a Data Ack, the system begins preparation for the next data transmission, and the transmitter eliminates from the transmit buffer all packets that were not requested In the Data-Ack packet, and moves the packets that were identified as missing in the Data-Ack packet to the transmitter's resend buffer. The DATA_ACK packets are then processed through the Resend Matrix. Any packets that were not identified in the DATA_ACK packet 605, but were originally in the Resend Matrix are assumed to be found packets by the receiver. The index associated with each is then used to clear that packet from the Resend Buffer 303. This frees up this packet of information for new Resend Packets. Any Resends that were not found will have their PIDs and associated indices to the Resend Buffer moved to the next matrix in the Resend Matrix 403. Any new Resends will be added to the new Matrix with the associated index to where they were moved in the Resend Buffer. On the next poll all resend packets are prepended to the front of the next group. Any packet space remaining is filled with new data packets. The requested missing packets are treated as a new group, but the original packet identifications are retained.

In the event of another poll or a continuing data transmission, the transmitter then proceeds as described above, by transmitting the requested group of identified missing packets first (as that group of packets has been loaded in the front end of the new group) followed by any new groups of packets. In the present example, if there were 15 resends, then after a Poll, the transmitter would first transmit the 15 resends as identified in the Resend Matrix. The transmitter would then transmit 150−15=135 new packets from the transmit buffer, thus completing a full 150 group size transmission sequence. It may be noted that the new group is only 135 packets in size. If there were more resends, the most that could occur would be a group size or 150 in the present example.

Figure 7:
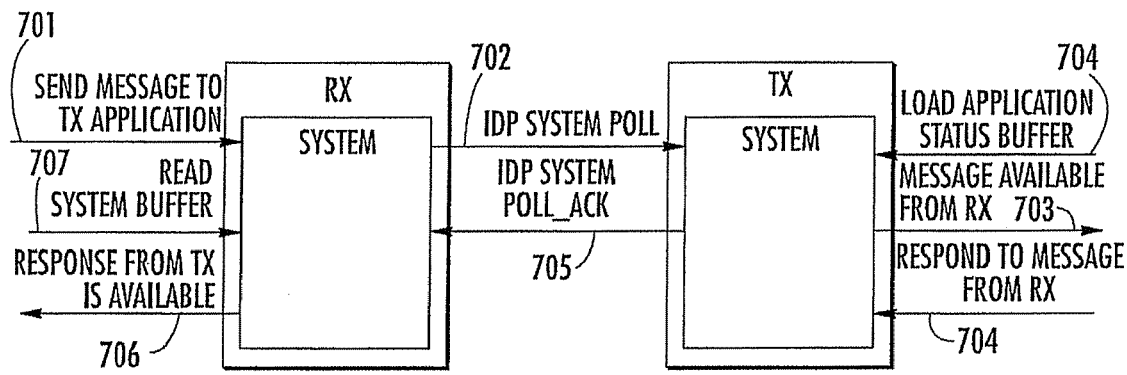
FIG. 7 shows a system communication sequence (wherein the system pipe is used for upper layer application-to-application communication) between a remote transmitter and a receiver at the data-recipient site.

As noted above, and as shown in the system sequence diagram of FIG. 7 (used for upper layer application-to-application communications), in addition to conducting data transport communications, the invention provides for the request of system and status information from the receiver to the transmitter. The status is a protocol status, corresponding to a request for information that is specific to the protocol (namely, configurable items, such as packet size). System communication provides for system-to-system communications between the transmitter-associated application and the receiver's associated application. Status is a Status Poll with a Status Poll_Ack. The Data portion of the Status Ack packet contains the requested status parameters.

As shown in the system pipe flow diagram of FIG. 7, in response to a system request 701, the receiver transmits a system Poll packet (step 702) to the transmitter. In response to the system Poll, the transmitter forwards (step 703) the contents of the system request to the associated application, which then returns the requested system information to the transmitter in step 704. This system information constitutes payload data for a System Poll-Ack packet 705, which is returned to the receiver. The return of system information is a pass/fail operation, and is indicated to the attendant program at the receiver at step 706. If system data is not received within a configurable period of time, the request will return an error to the application. If system data is received, then the application is informed that it is available. It is the responsibility of the application to read the buffer at shown at step 707.

Figure 8:
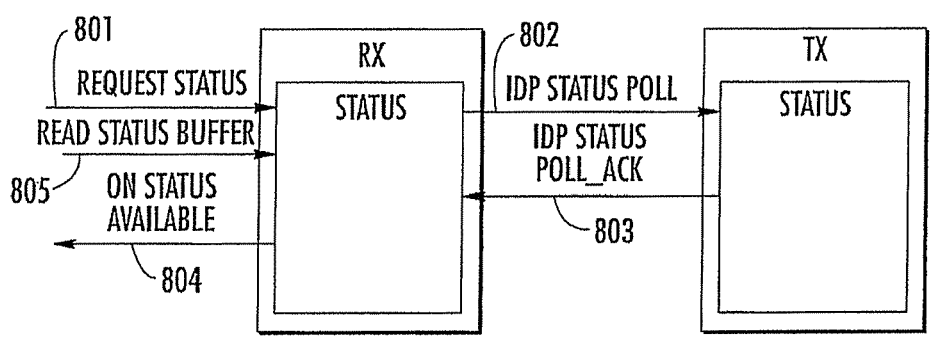
FIG. 8 shows a status communication sequence (wherein the status pipe is used for collection of protocol information from a respective IDP transmitter) between a remote transmitter and a receiver at the data-recipient site.

In addition to data and system sequence communications, the invention provides a status sequence to collect protocol parameterized data, as shown in the status pipe flow sequence of FIG. 8. In response to a request for status at step 801, the receiver forwards a status Poll packet in step 802 to the transmitter. The transmitter then responds with a status poll acknowledgement in step 803. A status available indication is provided at step 804, so that the status buffer may be read at step 805.

As will be appreciated from the foregoing description, the relatively low transport efficiency associated with having to return an acknowledgement transmission for each successively transmitted packet in a relatively long range wireless data communication network, particularly one containing a large number of transmitters, is effectively obviated in accordance with the present invention, which returns an acknowledgement only upon receipt of a plurality or group of packets, the number of which is known by the receiver, and identifying missing packets in the acknowledgement message. The transmitter then immediately, or in reply to a further poll, prepends the missing packets to any new packets awaiting transmission.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A method of conducting wireless packetized digital data communications between a first transceiver device and a second transceiver device, geographically remote with respect to said first transceiver device, said method comprising the steps of:
   (a) selectively wirelessly transmitting a polling message to said first transceiver device from said second transceiver device;
   (b) in response to receipt of said polling message, wirelessly transmitting, from said first transceiver device to said second transceiver device, a poll acknowledgement message representative of whether said first transceiver device has data to send and a quantity of data to be sent;
   (c) in response to receipt of said poll acknowledgement message indicating that said first transceiver device has data to send, wirelessly transmitting, from said second transceiver device to said first transceiver device, a data request message;
   (d) in response to receipt of said data request message, wirelessly transmitting, from said first transceiver device to said second transceiver device, a data message containing a plurality of data packets;
   (e) in response to receipt of said data message, storing data contained in data packets of said data message, and storing information representative of any data packets missing from said data message; and
   (f) wirelessly transmitting from said second transceiver device to said first transceiver device, a data acknowledgement message that includes said information representative of any data packets missing from said data message and that requests said first transceiver device to transmit all packets except for specifically identified packets.

2. The method according to claim 1, wherein step (f) comprises wirelessly transmitting from said second transceiver device to said first transceiver device, a data acknowledgement message that requests said first transceiver device to retransmit only specifically identified packets and fill the remainder of the data message with new packets.

3. The method according to claim 1, wherein step (f) comprises wirelessly transmitting from said second transceiver device to said first transceiver device, a data acknowledgement message that requests said first transceiver device to retransmit all packets of the last data message.

4. The method according to claim 1, further including the step of:
   (g) subsequent to receipt of said data acknowledgement message, wirelessly transmitting, from said first transceiver device to said second transceiver device, a further data message containing data packets missing from said data message transmitted in step (d).

5. The method according to claim 4, wherein said data acknowledgement message transmitted in step (f) includes information that indicates whether said further data message is to be immediately transmitted, and wherein step (g) comprises, in response to information indicating that said further data message is to be immediately transmitted, wirelessly transmitting, from said first transceiver device to said second transceiver device, said further data message containing said data packets missing from said data message transmitted in step (d).

6. The method according to claim 4, wherein step (e) comprises storing data contained in a respective group of data packets in an associated data buffer of a group storage section of a memory of said second transceiver device, and storing said information representative of any data packets missing from said data message in a reseed buffer of said group storage section of said memory of said second transceiver device.

7. The method according to claim 6, wherein step (f) comprises assembling said data acknowledgement message in accordance with the contents of said resend buffer of said group storage section of said memory of said second transceiver device.

8. The method according to claim 1, wherein step (g) includes storing, in a resend packet buffer, those data packets that were identified in said data acknowledgement message as missing from said data message transmitted in step (d), and assembling said further data message for wireless transmission to said second transceiver device in accordance with the contents of said resend packet buffer.

9. A system for wirelessly transporting packetized digital data from a data-sourcing site to a data-reception site, that is geographically remote with respect to said data-sourcing site, said system comprising:
  at said data-sourcing site, a first transceiver, which is operative to assemble digital data coupled thereto into a data message containing a group of packets, a packet containing a plurality of bytes of said digital data, and to selectively wirelessly transmit said data message to said data-reception site in accordance with a prescribed communication protocol; and
  at said data-reception site, a second transceiver, which is operative to receive said data message from said data-sourcing site, and to recover therefrom said digital data from said group of packets in accordance with said prescribed communication protocol;
  said prescribed communication protocol comprising the following procedure:
  (a) selectively wirelessly transmitting a polling message to said first transceiver from said second transceiver;
  (b) in response to receipt of said polling message, wirelessly transmitting, from said first transceiver to said second transceiver, a poll acknowledgement message representative of whether said first transceiver has data to send and a quantity of data to be sent;
  (c) in response to receipt of said poll acknowledgement message indicating that said first transceiver has data to send, wirelessly transmitting, from said second transceiver to said first transceiver, a data request message;
  (d) in response to receipt of said data request message, wirelessly transmitting, from said first transceiver to said second transceiver, said data message;
  (e) in response to receipt of said data message, storing at said second transceiver data packets contained in said data message, and storing information representative of any data packets missing from said data message;
  (f) wirelessly transmitting from said second transceiver to said first transceiver, a data acknowledgement message that includes said information representative of any data packets missing from said data message; and
  (g) subsequent to receipt of said data acknowledgement message, wirelessly transmitting, from said first transceiver to said second transceiver, a further data message containing information associated with data packets missing from said data message transmitted in step (d).

10. The system according to claim 9, wherein said data acknowledgement message transmitted in step (f) includes information that indicates whether said further data message is to be immediately transmitted, and wherein step (g) comprises, in response to information indicating that said further data message is to be immediately transmitted, wirelessly transmitting, from said first transceiver to said second transceiver, said further data message containing said data packets missing from said data message transmitted in step (d).

11. The system according to claim 9, wherein said second transceiver contains a group storage memory containing a plurality of group storage sections, a respective group storage section thereof including a data buffer and a resend buffer, and wherein step (e) comprises storing data contained in a respective group of data packets in an associated data buffer of said group storage section, and storing said information representative of any data packets missing from a respective group of said data message in said resend buffer.

12. The system according to claim 11, wherein step (f) comprises assembling said data acknowledgement message in accordance with the contents of said resend buffer of said group storage section of said memory.

13. The system according to claim 9, wherein said first transceiver contains a resend buffer, and step (g) comprises storing, in said resend packet buffer, those data packets that were identified in said data acknowledgement message as missing from said data message transmitted in step (d), and assembling said further data message for wireless transmission to said second transceiver in accordance with the contents of said resend packet buffer.

14. The system according to claim 9, wherein step (g) comprises wirelessly transmitting from said second transceiver to said first transceiver, a data acknowledgement message that requests said first transceiver to retransmit one of only missing packets, all packets of the last data message, or all packets of the last data message except for the ones identified in the data acknowledgement message.

15. A transmitter for wirelessly transmitting packetized digital data from a data-sourcing site to a data-reception site, geographically remote with respect to said data-sourcing site, said transmitter including a transceiver, which is operative to assemble digital data coupled thereto into a data message containing a group of packets, a packet containing a plurality of bytes of said digital data, and to selectively wirelessly transmit said data message to said data-reception site in accordance with a prescribed communication protocol, said prescribed communication protocol comprising the following procedure:
  (a) in response to receipt of a polling message that has been wirelessly transmitted from said data-reception site, wirelessly transmitting, from said transceiver to said data-reception site, a poll acknowledgement message representative of whether said transceiver has data to send and a quantity of data to be sent;
  (b) in response to receipt of a data request message from said data-reception site, wirelessly transmitting said data message from said transceiver to said data-reception site, said data-reception site, in response to receipt of said data message, storing data contained in data packets of said data message, and storing information representative of any data packets missing from said data message; and
  (c) in response to receipt of a data acknowledgement message from said data-reception site, said data acknowledgement message including said information representative of any data packets missing from said data message and requesting transmission of all packets except for specifically identified packets, wirelessly transmitting, from said transceiver to said data-reception site, a further data message containing data packets missing from said data message transmitted in step (b).

16. The transmitter according to claim 15, wherein said data acknowledgement message includes information that indicates whether said further data message is to be immediately transmitted, and wherein step (c) comprises, in response to information indicating that said further data message is to be immediately transmitted, wirelessly transmitting, from said transceiver to said data-reception site, said further data message containing said data packets missing from said data message transmitted in step (b).

17. The transmitter according to claim 15, wherein step (c) comprises in response to receipt from of a data acknowledgement message said data-reception site, said data acknowledgement message including information representative of any data packets missing from said data message, wirelessly transmitting, from said transceiver to said data-reception site, a further data message containing one of only missing packets or all packets of the last data message.

18. A data-reception site apparatus for wirelessly receiving, from a data-sourcing site geographically remote with respect to said data-reception site, packetized digital data contained in a data message containing a group of packets, a packet containing a plurality of bytes of said digital data, said apparatus comprising a data-reception site transceiver, which is operative to receive said data message from said data-sourcing site, and to recover therefrom said digital data from said group of packets in accordance with a prescribed communication protocol, said prescribed communication protocol comprising the following procedure:

(a) selectively wirelessly transmitting a polling message to said data-sourcing site;

(b) in response to receipt from said data-sourcing site of a poll acknowledgement message representative of whether said data-sourcing site has data to send and a quantity of data to be sent, wirelessly transmitting, from said transceiver to said data-sourcing site, a data request message;

(c) in response to receipt of said data message from said data-sourcing site, storing data packets contained in said data message, and storing information representative of any data packets missing from said data message; and (d) wirelessly transmitting, from said transceiver to said data-sourcing site, a data acknowledgement message that includes said information representative of any data packets missing from said data message, requests transmission of all packets except for specifically identified packets from data-sourcing site, and is operative to cause said data-sourcing site to wirelessly transmit a further data message containing data packets missing from said data message.

19. The data-reception site apparatus according to claim 18, wherein said data acknowledgement message includes information that indicates whether said further data message is to be immediately transmitted or is to be transmitted in response to a further poll message from said transceiver.

20. The data-reception site apparatus according to claim 18, wherein said data acknowledgement message requests said transceiver to retransmit one of only missing packets or all packets of the last data message.

* * * * *